(12) United States Patent
Clemmensen et al.

(10) Patent No.: US 8,831,598 B1
(45) Date of Patent: Sep. 9, 2014

(54) METHOD AND APPARATUS FOR SATELLITE COMMUNICATION

(75) Inventors: Daniel G. Clemmensen, Great Falls, VA (US); Sadaf Fardeen, Centreville, VA (US)

(73) Assignee: VT IDirect, Inc., Herndon, VA (US)

( * ) Notice: Subject to any disclaimer, the term of this patent is extended or adjusted under 35 U.S.C. 154(b) by 0 days.

(21) Appl. No.: 13/492,730

(22) Filed: Jun. 8, 2012

(51) Int. Cl.
*H04W 88/02* (2009.01)

(52) U.S. Cl.
USPC .......................................................... 455/427

(58) Field of Classification Search
USPC ......... 455/12.1, 13.1, 427; 340/531; 707/756, 707/748; 715/753, 765; 370/326, 330; 348/144; 33/1 A; 700/284
See application file for complete search history.

(56) References Cited

U.S. PATENT DOCUMENTS

| | | | |
|---|---|---|---|
| 6,792,684 B1* | 9/2004 | Hyyppa | 33/1 A |
| 7,792,068 B2* | 9/2010 | Robert et al. | 370/316 |
| 2002/0041328 A1* | 4/2002 | LeCompte et al. | 348/144 |
| 2003/0012180 A1* | 1/2003 | Donahue et al. | 370/352 |

* cited by examiner

*Primary Examiner* — Diane Mizrahi
(74) *Attorney, Agent, or Firm* — Oblon, Spivak, McClelland, Maier & Neustadt, L.L.P.

(57) ABSTRACT

A method of communicating via a satellite using a remote apparatus includes determining a geographical location of the remote apparatus, and determining a local data set corresponding to the geographical location. The data set includes communication parameters for a communication conducted by the remote apparatus from the geographical location. The method also includes retrieving the local data set from a global data set stored entirely in a memory of the remote apparatus, and conducting the communication via the satellite by the remote apparatus according to the communication parameters. The global data set includes local data sets corresponding to every geographical location in the world. A corresponding apparatus, a method and apparatus for generating a global data set, and a satellite communication system are also disclosed.

9 Claims, 11 Drawing Sheets

| 1: 2,3; 2:3,4; | 1:2,3; 2:3,4; 5:1,2; | 1:3,4; 2:4,5; 5:1,2; | 1:3,4; 2:4,5; 5:1,2; | 5:3,4; |
|---|---|---|---|---|
| 1:2,3; 2:3,4; | 2:3,4; 1:2,8; | 1:2,8; 2:4,5; | 2:2,6; 5:6,7; | 1:5,6; |
| 2:7,4; | 2:7,4; | 1:2,6; | 1:3,6; | 1:5,6; |
| 2:3,4; 1:2,8; | 1:3,6; 5:7,1; | 1:2,8; 2:4,5; | 1:3,6; 5:7,1; | subgrid |
| 1:2,8; 2:4,5; | 1:2,3; 2:3,4; 5:1,2; | 1:3,4; 2:4,5; 5:1,2; | 1:3,4; 2:4,5; 5:1,2; | 5:7,1; |

METHOD AND APPARATUS FOR SATELLITE COMMUNICATION

BACKGROUND

1. Field of the Disclosure

This disclosure relates in general to satellite communication and, in particular, to a method and apparatus to obtain satellite beam information at a given geographical location.

2. Discussion of the Background

In order to provide broadband connectivity at a geographical location, it may be necessary for a remote apparatus such as a mobile satellite communication device or remote apparatus to obtain certain communication parameters, including satellite beam receive quality and transmit gain information corresponding to the geographical location. The communication parameters may be used to select a beam when more than one beam is available. The communication parameters may be stored in a geographical map that occupies a significant amount of memory. In a conventional system, the geographical map may be stored at a central location, such as at a hub, and served in small pieces to the remote apparatus. Portions of map data may be periodically fetched by the remote apparatus over the air as needed. The conventional in memory data structures used to contain information read from the map may use undesirably large amounts of memory.

SUMMARY

Accordingly, an object of the present disclosure is to provide a method of communicating via a satellite using a remote apparatus, the method including determining a geographical location of the remote apparatus, determining a local data set corresponding to the geographical location, the data set including communication parameters for a communication conducted by the remote apparatus from the geographical location, retrieving the local data set from a global data set stored entirely in a memory of the remote apparatus, the global data set including local data sets corresponding to every geographical location in the world, and conducting the communication via the satellite by the remote apparatus according to the communication parameters.

Another object of the present disclosure is to provide a method of generating a global data set storing communication parameters into a plurality of local data sets each having satellite communication parameters, the method comprising arranging the communication parameters into a plurality of hierarchically arranged grids each corresponding to a different geographic location, and splitting a grid into plural subgrids when an amount of data in the grid is more than a predetermined value.

Another object of the present disclosure is to provide an apparatus for satellite communication, the apparatus comprising a remote apparatus including a memory unit configured to store a global data set including data sets corresponding to every geographical area in the world, each data set including a plurality of cells, each cell including communication parameters for a unique geographical location, a locating unit configured to determine a geographical location of the remote apparatus, a determining unit configured to determine a local data set corresponding to the geographical location, the data set including communication parameters for a communication conducted by the remote apparatus from the geographical location, a retrieving unit configured to retrieve the local data set from a global data set stored entirely in a memory of the remote apparatus, the global data set including local data sets corresponding to every geographical location in the world, and a communication unit configured to conduct the communication via the satellite by the remote apparatus according to the communication parameters.

Another object of the present disclosure is to provide a non-transitory computer readable medium having computer readable instructions thereon that when executed by a computer cause the computer to perform a method comprising determining a geographical location of a remote apparatus, determining a local data set corresponding to the geographical location, the data set including communication parameters for a communication conducted by the remote apparatus from the geographical location, retrieving the local data set from a global data set stored entirely in a memory of the remote apparatus, the global data set including local data sets corresponding to every geographical location in the world, and conducting the communication via the satellite by the remote apparatus according to the communication parameters.

Another object of the present disclosure is to provide a satellite communication system, the system comprising a hub apparatus, a satellite, and a remote apparatus communicating with the hub apparatus via the satellite, the remote apparatus including a memory unit configured to store a global data set including data sets corresponding to every geographical area in the world, each data set including a plurality of cells, each cell including communication parameters for a unique geographical location, a locating unit configured to determine a geographical location of the remote apparatus, a determining unit configured to determine a local data set corresponding to the geographical location, the data set including communication parameters for a communication conducted by the remote apparatus from the geographical location, a retrieving unit configured to retrieve the local data set from a global data set stored entirely in a memory of the remote apparatus, the global data set including local data sets corresponding to every geographical location in the world, and a communication unit configured to conduct the communication via the satellite by the remote apparatus according to the communication parameters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows an example grid according to an embodiment of the invention;

FIG. 6 shows another example grid according to an embodiment of the invention;

DETAIL DESCRIPTION OF THE EMBODIMENTS

The invention includes an apparatus and method that may advantageously reduce the storage size of a geographical map that contains the same information as a conventional unreduced map, and a method of using the compressed map for satellite communication. This reduction may advantageously allow the geographical map for all geographical locations in the entire world to be stored on each individual remote apparatus including limited resources, rather than on a map server located near the hub. The invention may also avoid the need for any over the air communication between the remote apparatus and a centrally located map server to transfer portions of the map to the remote apparatus. The invention may also reduce the size of memory consumed when reading the map.

Figure 1:
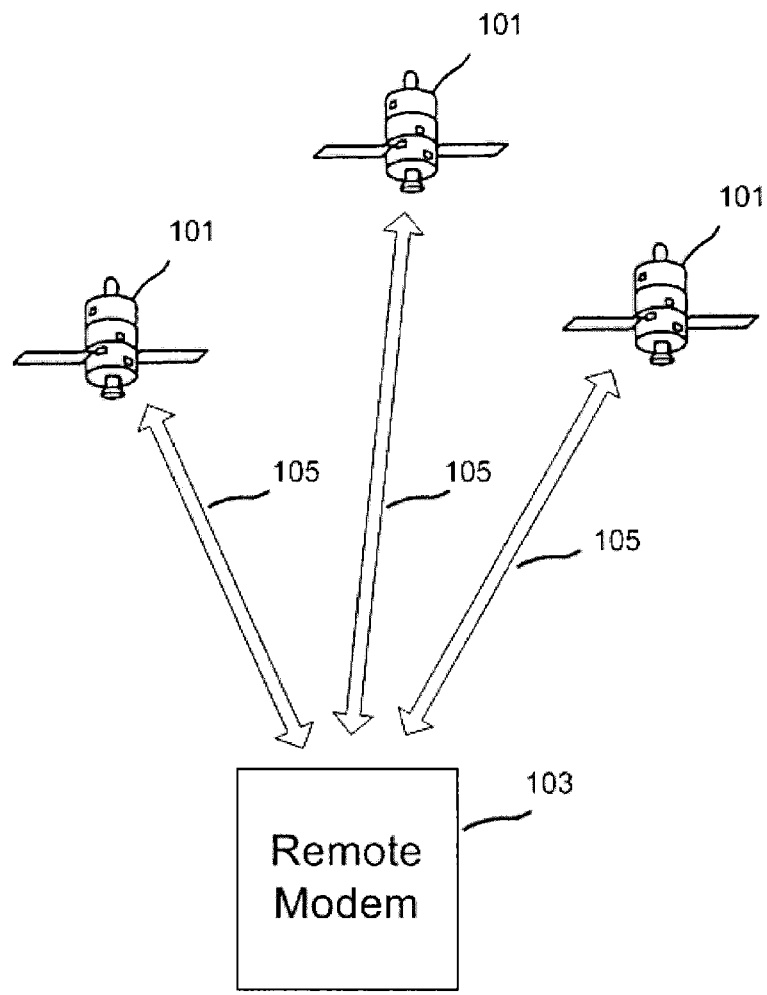
FIG. 1 shows a satellite communication system according to an embodiment of the invention.

Referring now to the drawings, wherein like reference numerals designate identical or corresponding parts throughout the several views, FIG. 1 shows a satellite communication system according to an embodiment of the invention, where several beams (105) from different satellites (101) are available to a remote modem (103). In a mobile application, a remote apparatus can be configured to use different beams in different geographic areas. The different beams can be on different satellites, or using different downstreams on the same satellite.

When the remote apparatus acquires the satellite inbound signal, the remote apparatus must find the best beam available for a current geographical location of the remote apparatus. Similarly, even when the inbound signal is acquired, the remote apparatus may move to another area where another beam would be better to use. The remote apparatus may determine which beams to try. To speed the switching and acquisition process, the remote apparatus may advantageously assess the relative desirability of the different beams, by comparing stored communication parameter information, without having to actually detect the beams or discover the communication parameters. The stored communication parameter information includes beam quality information that may be different for different geographical locations. According to an embodiment of the invention, a file stores the beam quality as a function of location. Such a file is referred to as a geographical map or map file. In addition, the map file may also store the geolocation dependent equivalent isotropically radiated power (EIRP in a dB scale) for an inbound satellite signal for different locations for each beam. The EIRP is used to correct an initial acquisition transmit power of the remote apparatus, and the EIRP may include a fixed offset from the gain to noise temperature (G/T) for the satellite footprint. G/T is a figure of merit in the characterization of antenna performance, where G is the antenna gain in dB at the receive frequency, and T is the equivalent noise temperature of the receiving system in Kelvin. G/T is an example of beam quality, as discussed herein. The actual transmit power needed by the remote terminal to acquire into a network from a given location may be different from the G/T for that location. This difference in the two values is a fixed number known as the fixed offset. The satellite footprint is the satellite's receive and transmit gain values for all geographical locations.

The file format of the invention also stores other geolocated communication parameters as may be required for other applications.

In a conventional system, the unreduced map may be too large to be stored on the remote apparatus, so the unreduced map is stored on a separate device, such as a general purpose computer or server.

A subset of the map that covers a geographical location around the remote apparatus in a 1000 km by 1000 km square is called a maplet. From the maplet, the remote can determine beam communication parameters including a beam quality metric and EIRP for each beam corresponding to a current location of the remote apparatus.

The quality metric may be used by the remote apparatus to determine which beam to use for a given location, according to the following rules. If the remote apparatus is not acquired into the network, the remote apparatus will attempt to enter the beam with the highest quality number. If the closed loop communication with the hub is setup, then the remote is considered acquired. The closed loop communication is setup when the hub can hear the remote's transmissions, and all physical layer corrections such as frequency errors and timing errors are handled. The hub continues assigning time slots to enable the remote to transmit in the assigned time slots on the TDMA inbound.

If the remote apparatus fails to acquire into the network after a predetermined amount of time, the remote apparatus will cycle through the lower quality beams in order of highest to lowest quality. A beam which the remote could not acquire is considered very low quality for the next 1 hour. When a remote apparatus is acquired into the network, the remote apparatus switches beams if there is a beam which has a quality which is higher than the beam quality of the current beam, plus an offset known as the quality_hysteresis. A single value of the quality_hysteresis may be stored in the map file, for example in the map file header, and may apply to all geographical locations, or a different quality_hysteresis value may be defined for each geographical location. Certain beam quality values may be encoded to have a special meaning. For example, a beam quality value of 0 may be used to indicate that the beam is not usable (at that geolocation).

The EIRP values may be used in two ways. When the remote apparatus acquires into the network, the remote apparatus may offset the initial transmit power by the EIRP value. The offset allows the system to compensate for G/T variations of the satellite. Alternatively, if the transmit power in the EIRP is set to "0", the beam may be designated receive only. The remote apparatus may consider itself locked on the beam if the downstream is locked, and the remote apparatus will not attempt to establish a return link. Setting the transmit power to "0" may be used to designate a "no transmit" geographic areas.

Map Formats

The invention includes plural different conveyance formats that may be used by a network operator to define the information in the map. A first conveyance format is the Intelsat format, which is used by Intelsat corporation, and a second conveyance format is "gxt" format, which is open for anyone to use.

Network operators may generate the map in a conveyance format, and a program according to an embodiment of the invention may be used to convert the map from the conveyance format to a compressed map file format according to an embodiment of the invention. The compressed map file may be transferred into a directory accessible to a map server process used by the remote apparatus.

According to an embodiment of the invention, for each beam, the compressed map contains the beam name as used in the network management system (NMS), one or more quality metrics for geolocations in the beam, and remote EIRP (for the inbound) for geolocations in the beam.

Compressed Map Format Description

The compressed map may be stored using ASCII characters. Whitespaces between fields are ignored, as are blank lines. The compressed map files may include a header section and a main body. The header section includes a list of all beam names specified as strings. The header section may also include other information about the scale and coverage of the map, specified in key value pairs. The body of the map file contains quality and gain information of visible beams at all possible locations on earth. The body of the map file may include a structure comprising only a limited character set in order to facilitate compression. For example, the character set may be limited to the following characters: {0-9,(,),{,},;,:,/,";"}

The map structure according to an embodiment of the invention advantageously provides fast lookup for a geolocation, small data memory footprint, and arbitrary granularity. Some embodiments of the invention may include a complex data structure with recursive structures, one-byte integers, minimal use of floating point, and minimal use of list lookups.

A program according to an embodiment of the invention to build the compressed map, called a maphandler, builds the recursive grid structure in memory and then uses the recursive grid structure to provide map information on demand. To retrieve information, maphandler starts at the topmost grid ("the world") and descends through progressively finer grids until a "value" is reached instead of a finer grid.

Conceptually, each grid is a rectangle with rows and columns, and each row contains one element per column. An element is either a finer grid or a value. If the entire area of the map that is represented by an element has uniform values, then the element is a value. If the entire area represented by an element is not uniform, then the element is a grid.

There are two areas of complexity in the map structure, and they can be understood independently. The first area is the recursive grid concept. This can be analyzed in terms of an abstract "grid" data structure. This analysis describes how we decide the shape and contents of each grid and grid entry. The second area is the way an individual grid is stored.

Abstract Map

The lookup algorithm included in the maphandler is indifferent as to the details of the recursive grid hierarchy, and may work with grids of up to 256 cells and with arbitrary depths. The lookup algorithm works with any depth of hierarchy and combination of information in individual cells. For example, a cell may have either one visible beam or many visible beams, and the pattern may either repeat or not repeat in other cells at the same hierarchy. The lookup algorithm works with all kinds and patterns of data in the hierarchical grid. Therefore, the mapconverter that creates the compressed map according to an embodiment of the invention is free to choose the sizes and depths based on other considerations. The depth may be determined by the resolution and distribution of geographical information present in the conveyance format map. For example, if a certain 10×10 degree area has a satellite footprint that is changing at every 0.01 degree of area, then the compressed structure representing this area will have more depth than another 10×10 area where the satellite footprint is changing at every 1 degree resolution. The choice of the number of cells is a design decision determined based on the ease of calculation, and the 180×360 degree geography of the world.

The maphandler starts the construction of the map by creating unreduced grids. According to one embodiment of the map format, the topmost grid covers the 180×360 degree world ("level 1", or $L_1$) with 2 rows and four columns, to divide the world into eight elements of 90×90 degrees each. However, other topmost grid formats, applicable to other design needs, are also included within the scope of the invention. According to the embodiment, each $L_2$ 90×90 grid has 9 rows and 9 columns to divide each topmost grid into 81 10×10 degree elements. Each $L_3$ grid is divided into 10 rows and 10 columns of 1×1 degree elements. Progressively finer grids ($L_n$ for n>3) have 10 rows and 10 columns which have 10 times finer resolution than $L_{n-1}$.

For a map with a resolution of $10^{-m}$ degrees, 4+m levels of grid are used. For example, a map with 0.01-degree resolution ($10^{-2}$ degrees) requires 6 levels of grid. The maphandler may also "square up" input data by prepending an "$L_0$ grid" above the topmost grid. This topmost grid has three rows and one column to handle the arctic and antarctic regions.

For an unreduced map, each level has 100 times the number of elements as the prior level, so the memory footprint is completely dominated by the deepest level and the size occupied by the shallower levels can be ignored.

Grid construction according to one embodiment proceeds in a depth-first fashion: that is, the topmost grid is created by first creating each child of the topmost grid. After a grid is created, it is "reduced". The reduction stage consolidates adjacent rows that have identical values, and then consolidates columns that have identical values. Reduction is done starting from the finest grids first. If a grid is reduced to a single row and single column, it is replaced by a value. A row or column that contains one or more grids cannot be reduced, thereby ending the reduction of that grid.

Lookup

Figure 2:
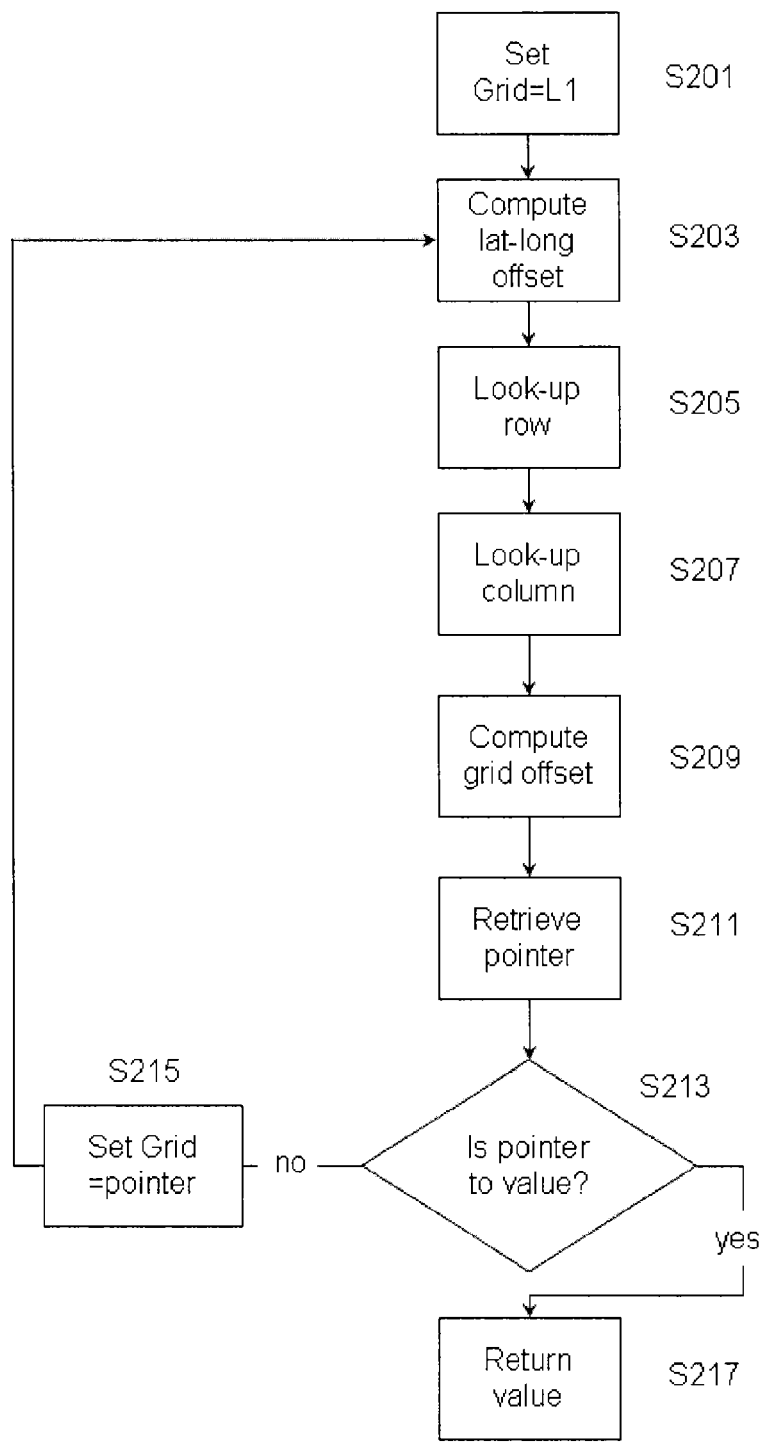
FIG. 2 is a flowchart of a grid look-up process according to an embodiment of the invention.

FIG. 2 shows an example of a flowchart for grid lookup according to an embodiment of the invention. In this example, there is only one topmost grid, so in step (S201) the process starts with setting grid=$L_1$. In step (S203), the latlong offset from the lower-left corner of the grid is computed. In step (205), the row is looked-up which requires at most n−1 comparisons where n<11. In step (207), the column is looked-up which requires at most m−1 comparisons where m<11. In step (209), the grid offset is computed. In step (S211), a pointer is retrieved. In step (S213), it is checked if the pointer is to a value, and if the answer is yes, the value is returned in step (S217). Otherwise the pointer is set as a grid in step (S215), and the process loops back to step (S203).

In the worst case, according to this example, 6 compares are performed at $L_1$, 18 compares at $L_2$, and 20 compares in each lower level. In practice this does not happen because most grids are reduced.

In-Memory Data Structures

A map contains data for each point on the Earth's surface for each beam in the map. The value for each beam at each point is stored as a pair of values. When a point is not covered by a particular beam, the beam's "data" for that point is a vector whose scalars are all zero. The map format does not distinguish between a location where there is no data for a beam and a location where a beam's vector is all zeros: all beams have a value at all points.

In a first embodiment of the invention, the value vector is of length two. The two scalars are the "quality" and the "TX gain." Each scalar is one byte. The beam number is one byte. Scalar values are from 0-255.

In a second embodiment of the invention, a grid is a complex data structure, and a value is a complex data structure. The grid data structure contains a one-byte "scale divisor", a column vector, and a row vector. All numbers according to this example are unsigned integers in the range 0-255, but the invention includes using other number types as well. Numbers are relative to the scale of the grid. The topmost map may always have a scale of 10 degrees and a divisor of 1, so the scale is 10 degrees: therefore the number "2" represents twenty degrees in this exemplary grid.

The row and column vectors identify the location of the internal divisions within the grid. The edges of the grid are determined by the parent. Thus, according to an embodiment of the invention, a 2×4 grid needs a row vector with one entry and a column vector with 3 entries.

Since, in this example, a top-level grid partitions the world into two rows and four columns, prior to reduction the row vector is (9) and the column vector is (9,18,27). These numbers identify the location of the partition divisions. The grid is 2×4 with a scale of 10, so starting from (0,0), there is one row partition division at 0+9, and three column partition divisions at 0+9, 0+2×9, and 0+3×9. The row vector is read as "divide this grid into a row for 0-9 and a row for 9-18." The column vector is read as "divide this grid into a column for 0-9, a column for 9-18, and a column for 18-27."

For deeper grids, the scale for the grid is the scale of a parent of the grid divided by the grid's scale divisor. An L1 grid has a divisor of one and therefore has the same 10-degree scale as the L0 parent of the L1 grid, because a 2 still means twenty degrees. This is because the $1^{st}$ level in the hierarchy is at units of 10 degrees. Therefore, an entry of 1 refers to 10 and an entry of 2 refers to 20. In one step down, the same scale of 10 degree units is maintained, but at the next level in depth, the scale should have more resolution. Therefore, the parent scale is multiplied by 10, which means that the units for this level are 1 degree instead of 10 degrees. Hence, at this level, 1 means 1 degree and 2 means 2 degrees. In one more level down, the resolution is 10 times increased, which is called a scale of 10 on top of the parent level's scale, and an entry of 1 means 0.1 degree, and an entry of 2 means 0.2 degree.

According to the present embodiment, L2 grids have 9×9 entries, each of which is a 10-degree square. Therefore, the unreduced row vector is (1,2,3,4,5,6,7,8), and so is the unreduced column vector. Note that all indexes are relative to the "lower left-hand corner" of the grid, and "the lower left-hand corner" is determined by the location of the grid within the parent. Thus, if this L2 grid is the grid for the second row, third column of the L1 grid, then this L2 grid represents the area from 90-180 latitude and from 180-270 longitude. A column entry of "2" therefore means that the column starts at 180+20, or 200 degrees.

The L3 grids each represent a 10×10 degree square. Each L3 subdivides the square into 100 entries each of which represent a 1×1 degree square. Therefore, the scale is divided by 10, because the parent uses a scale of ten degrees. After applying the divisor, an unreduced row vector of (1,2,3,4,5,6,7,8,9) results and the same for the column vector. Now, a "2" means "two degrees."

The L4 grids each represents a 1×1 degree square. Each L4 subdivides the square into 100 entries each of which represents a 0.1×0.1 degree square. The scale is again divided by 10 and results in the same unreduced row and column vectors, but now a "2" means 0.2 degrees." This pattern repeats for progressively deeper levels.

Reduction

After an unreduced grid hierarchy is produced, each grid in the hierarchy is reduced. If all columns in the first row are equal to their counterparts in row 2, then the first row is removed from the grid and the first element is removed from the row vector. For example, if the row vector was (1,2,3,4,5,6,7,8,9) before this reduction, it becomes (2,3,4,5,6,7,8,9). This means that the first row now spans from 0-2. At the extreme, all rows are identical, in which case the row vector becomes ( ) i.e., the 0-length vector. This means that the (only) row spans from 0-max.

After the row reduction is complete, a corresponding reduction is performed for the columns. If reduction to a single row with a single column is achieved, then the entire grid has the same value, and the grid's entry in the parent is replaced with this same value.

Since map building is depth-first, there is at most one unreduced grid per level at any one time.

Below is an example of a reduced map according to an embodiment of the invention.

//map header
MAP:
0000-00-00-000000:
   version="1.0",lat_scale=100,lat_start=0,lat_end=1800,
lng_scale=100,lng_start=0,lng_end=3600,hysteresis=5,
rcv_only_support=1
   {0-72=0-18000}
   "Data generated by GXT importer"
   NSS7_Ku_US_Beam 1:;
   //recursive map structure
   (0,0) //topmost grid representing the whole world
   {0,9: //topmost Level 1 grid has two rows 0, 9×10=90 degrees
   0,9,18,27; //topmost Level 1 grid has 4 columns 0,90,180, 270 degrees
   (0,0) //$1^{st}$ cell (0,0) of the 2×4 Level 1 grid
   {0,4,5,6,7,8: //$1^{st}$ cell has 6 rows at 0,40,50,60,70,80 degrees. It
   //doesn't have 9 rows because of reduction
   0,7,8; //$1^{st}$ cell has three columns at 0,70,80 degrees
   (0,0) //cell (0,0) of Level 2 grid
   {10/0,6,7,8,9: //cell (1,1) has 5 rows at 0,6,7,8,9 degrees
   10/0,9; //this is Level 3 hence the scale is reduced by 10 times.
   (1,1)
   {10/0,5: //Level 4
   10/0,9;
   (1,1)
   1:0,3; //no more grid division. Beam_1 with 0, 3 Rx, Tx values.
   }
   }
   }
   (0,1) //no more grids in this Level 1 cell
   1:1,4; //Beam 1 with 1,4 quality and gain values
   2:3,4; //Beam 2 also visible in this cell.
   (0,2)
   (0,3)
   (1,0)
   (1,1)
   (1,2)
   (1,3) //rest of Level 1 cells have neither grids nor values. They have no
   //visible beams
   }

Figure 3:
FIG. 3 shows an example maplet according to an embodiment of the invention.

FIG. 3 shows an example maplet (301) according to an embodiment of the invention. Note that (0,0,0,0,0,0,0,0) (303) represents the following parameters (Beam1_quality, Beam1_gain, Beam2_quality, Beam2_gain, Beam3_quality, Beam3_gain, Beam4_quality, Beam4_gain).

Lat 40, Lon 20 grid should be expanded as following:
Cell1: (0,0,0,0,0,0,0,0)
Cell2: (0,0,0,0,0,0,1,0)

Cell3: (0,0,0,0,0,0,2,0)
Cell4: (0,0,0,0,0,0,0,0)
Cell5: (0,0,0,0,0,0,0,0)
Cell6: (0,0,0,0,0,0,0,0)
Cell7: (0,0,0,0,0,0,0,0)
Cell8: (0,0,0,0,0,0,0,0)
Cell9: (0,0,0,0,0,0,0,0)
Cell10: (0,0,0,0,0,0,0,0)

Figure 4:
FIG. 4 shows an example reduced maplet according to an embodiment of the invention.

FIG. 4 shows a reduced maplet format (401) according to an embodiment of the invention.

The following is an example maplet in ASCII form:
//this is Level 2 grid
(0,0)
{0,2,4:
0,2,3,4;
(1,0)
(1,1)
(1,2)
4:7,0;
(1,3)
3:5,128;
4:4,0;
(2,0)
(2,1)
{0:
0, 1, 2, 3;
(0,0)
(0,1)
4:1,0;
(0,2)
4:2,0;
}
(2,2)
4:7,0;
(2,3)
3:5,128;
4:6,0;
}

Map Size Reduction on System Memory (e.g., Flash Memory)

A complete map with data for every geolocation in the world may be stored entirely on the remote apparatus. Therefore, it is advantageously possible to avoid requesting transfer of maplet portions over the air from a remote mapserver. By storing the entire map on the remote apparatus, airborne mobile modems are also possible. Due to resource limitations, it is not advantageous to store large amounts of data in the memory (e.g., flash memory) of the remote apparatus. This section describes techniques for further reducing the size of map stored on the remote apparatus. A program, according to an embodiment of the invention, to further reduce the map size, is called MapTools. MapTools may execute on a conventional general purpose computer, such as an x86 machine on the ground, which has ample resources, and execution of MapTools is not constrained by CPU cycles and memory usage. An embodiment of the invention advantageously maximizes map size reduction.

Absolute Cell Number

An embodiment of the invention includes an absolute cell numbering technique with an absolute cell number to denote each cell within a grid. This is done at a grid level. Since any sub grid can be a maximum of 10×10 cells, the maximum possible cell number is 99. That limits the upper range of the value used for a cell number, according to one embodiment. Other maximum cell numbers limit the upper range for other grid cell numbers.

If a grid has rows from 0-9 and columns from 0-9, then (1,2) may be written, according to an embodiment of the invention, as (12).

Range

An embodiment of the invention also includes a range technique that combines consecutive cells and writes them in the form of a range.

Figures 5, 6:
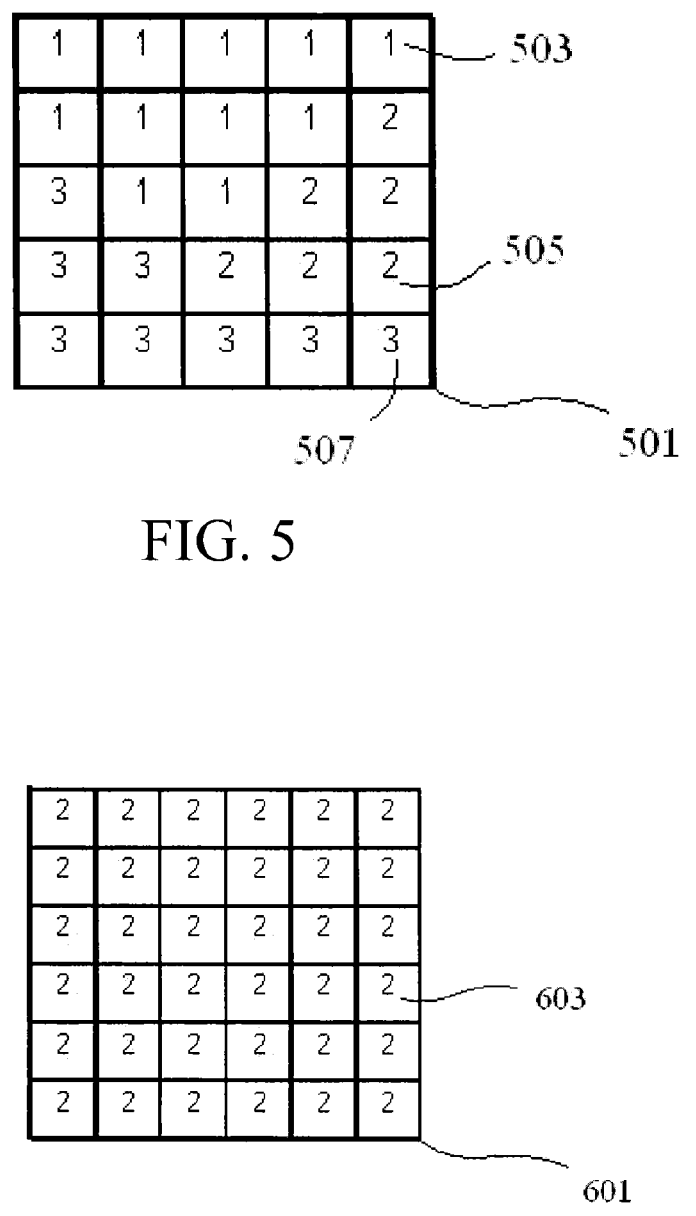

FIG. 5 shows an example grid (501) that has beam information values of 1 (503), 2 (505), and 3 (507). According to the range technique, the beam information values of 1, 2, 3 will be stored in the map as follows:
(0-8)
1;
(9)
2;
(10)
3;
(11-12)
1;
(13-14)
2;
(15-16)
3;
(17-19)
2;
(20-24)
3;

Implicit Indexes

A conventional map structure may store consecutive cells explicitly as shown below:
(1)
1;
(2)
1;
(3)
1;
(4)
1;

According to an embodiment of the invention, an implicit index technique may reduce map size by using implicit references to consecutive cells. Instead of writing the complete cell number a ")" is used to denote the next cell, which may reduce the number of characters appearing in the map. The above given example will be store like the following, after application of the implicit index technique:
)
1;
)
1;
)
1;
)
1;

Beam Information Index

Each cell of a sub grid of map contains beam information value. This information includes the number of beams available at that location, each having beam quality and transmit gain values. According to a beam information index technique of an embodiment of the invention, beam information is explicitly stored only the very first time it appears in the map. Subsequent use of the same information is stored by the use of an index that refers to the previously stored value. For example, an index of 1 refers to the first stored explicit beam information, index 2 refers to the second stored explicit and so on. Beam vectors that list beam information values may also be stored according to such an index technique, according to an embodiment of the invention.

In the following example of existing map
(1)
1:2,3;
2:1,4;
(2)
1:2,3;
(3)
2:1,4;
(4)
1:2,3;
2:1,4;
(5)
3:4,1;

The above map may be stored according to the indexing technique according to an embodiment of the invention, as follows:
(1)
1:2,3;
2:1,4;
(2)
1;
(3)
2; //reference to second beam value
(4)
1 //reference to first beam vector. Notice absence of semi-colon
(5)
3:4,1;

Memory Considerations of Remote Apparatus

Once the reduced map is stored in a mass storage of the remote apparatus, such as flash memory, maphandler will read the reduced map into operating memory as required. Mass memory may refer to a large persisting machine readable memory. Operating memory may refer to a RAM which is relatively faster and smaller than the operating memory. Reading the whole map into operating memory may not be possible considering the relatively small amount of RAM operating memory in remote apparatuses. To solve this problem a maphandler according to an embodiment of the invention includes the following techniques.

Grid Splitting in the Map

Each cell of a grid may contain beam related information as discussed above. Each cell can either have beam information for one beam or for many beams. A grid can have a maximum of 100 cells, according to one example. If each cell has 5-6 visible beams and the information in each beam of each cell is unique, then there are stored 500-600 beam information values. The compact data structure described in the sections above indexes these beam values. The data type used for indexing is a byte, according to one embodiment. Using the byte limits the number of beam values to 256. Therefore, to accommodate 500-600 values, the grid is split. The technique for splitting according to an embodiment of the invention will continue recursively until less than 256 beam values are stored in one subgrid. The splitting will not create subgrids at the same level. Splitting will create two sub grids and distribute the cells equally among them.

Figure 7:
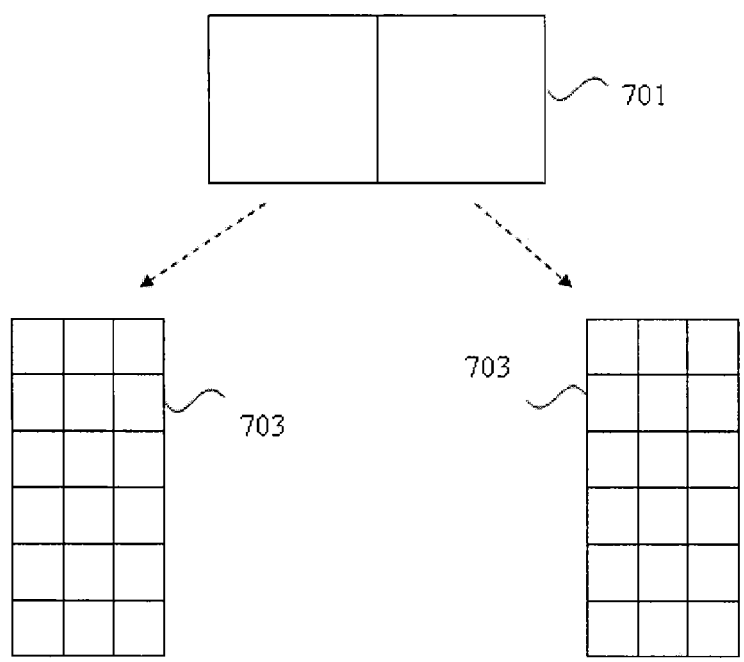
FIG. 7 shows an example of a grid that is split according to an embodiment of the invention.

FIG. 6 shows an example of a 6×6 grid (601) called. The number in each cell (603) represents the number of beam values present in that beam, according to the example. Thus, in this example, there are a total of 72 beam values in the grid. If the maximum allowed beam values in a grid is 50 then this grid will be split as shown in FIG. 7, resulting in a grid (701) with two cells instead of 36 as shown earlier. Each of the cells will further contain a subgrid (702) of 6×3.

Figure 8:
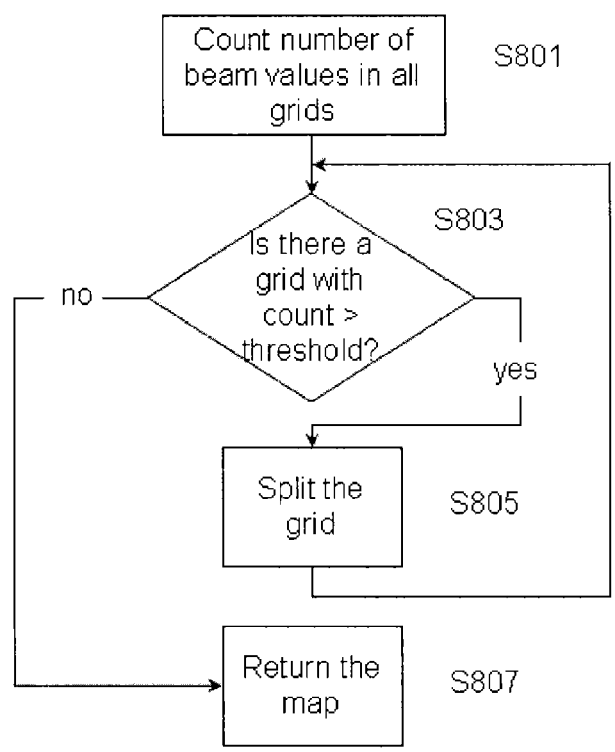
FIG. 8 is a flowchart for grid splitting according to an embodiment of the invention.

FIG. 8 shows a process for grid splitting according to an embodiment of the invention. In step (S801), the number of beam values in all grids are counted starting at the top most cell, and traversing through all grids recursively. The beam value count of a body will either be equal to the count of its grid or the number of beam values present in the body. The count of all cells in a grid will be added to give the count for the grid. Once the count for each cell in the map is available the process moves on to the next step. The beam values of all leaves of a grid are added, where the leaves are the sub grids of the grid. In step (S803), it is checked if there is a grid with count greater than a predetermined threshold, and if the answer is yes, then two new grids are created in step (S805) where half of the earlier grid is assigned as a sub grid to each of the newly created grids, and the process loops back to step (S803). Otherwise, the map is returned in step (S807).

Grid Marking

To save on memory usage by maphandler, maphandler will not read the complete map from mass memory into operating memory all at once. According to an embodiment of the invention, a stored map may contain grids that are marked for being skipped by the maphandler. To mark a grid in the map, a ":" will be placed before the beginning of the tree.

Old grid beginning
{
Marked grid beginning
:{

Maphandler will not read the marked subgrids, which will therefore reduce the size of the operating memory being consumed by the world map on the apparatus. If maphandler needs to read map information for a point that lies in the grid marked for skipping, then that grid will be read into the operating memory. The map will be marked such that the size of the portion being read into the operating memory is not larger than a predetermined threshold size value. If the grid that is being read into operating memory is a maplet, then at any given point there are advantageously 4 maplets simultaneously stored in operating memory according to one embodiment of the invention. By storing 4 maplets, a remote apparatus that moves in circles around a point lying at the intersection of four maplets may be handled without disadvantageous frequent retrieval of maplets from mass storage.

The grid marking process begins at the top most cell, and traverses through all grids recursively to count the number of beam values and cells in a grid. The default count for each cell is one. The count of beam values is added to get the node count for that cell. The node count for a grid is the sum of the node count of its cells. The process proceeds from leaf to trunk in a recursive fashion. Once the beam count is done, the function for marking the grid is called. The grid marking function is called recursively until reaching the bottom most level. If the parent's node count is bigger than a predetermined threshold then the child grid with biggest node count is marked. The parent's node count is adjusted to subtract the marked child's node count. This subtraction will be recursive too. After completing the step of marking the child's node, climb one level up on the tree and repeat these last two steps recursively until climbing all the way to the top most cell.

The following steps summarize an embodiment of the grid marking process:
1. Start with the topmost node.
2. See if the count is greater than a threshold.
3. If yes, then go to the largest unmarked child.
4. Repeat steps 2-3 recursively until a node is reached which is smaller than the threshold.
5. Once a node is reached which is smaller than the threshold, mark it. Point to the parent.
6. Adjust the count of parent.

7. Check if the parent is still greater than threshold. If yes, repeat steps 2 to 4.
8. If parent is not greater than threshold, point to its parent and repeat steps 6 to 8.
9. Stop once topmost level is reached.

Figure 9:
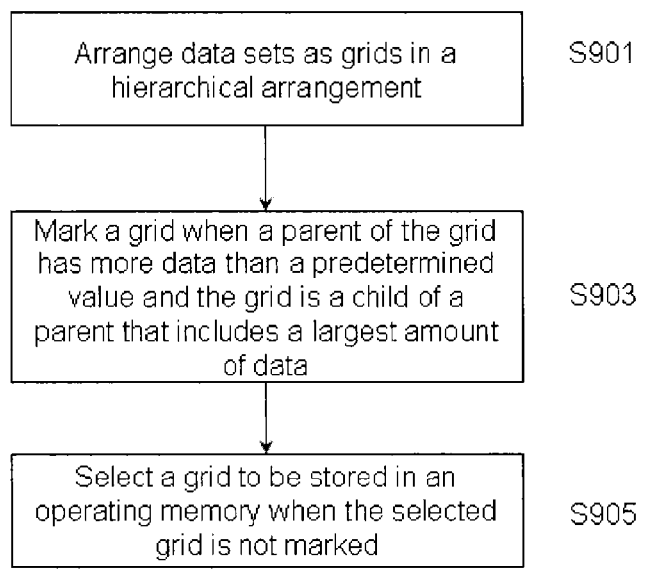
FIG. 9 is a flowchart for grid marking according to an embodiment of the invention.

FIG. 9 shows a flowchart for the process of grid marking according to an embodiment of the invention. In step (S901), data sets are arranged as grids in a hierarchical arrangement. In step (S903), a grid is marked when a parent of the grid has more data than a predetermined value and the grid is a child of a parent that includes a largest amount of data. In step (S905), a grid is selected to be stored in an operating memory when the selected grid is not marked.

Figure 10:
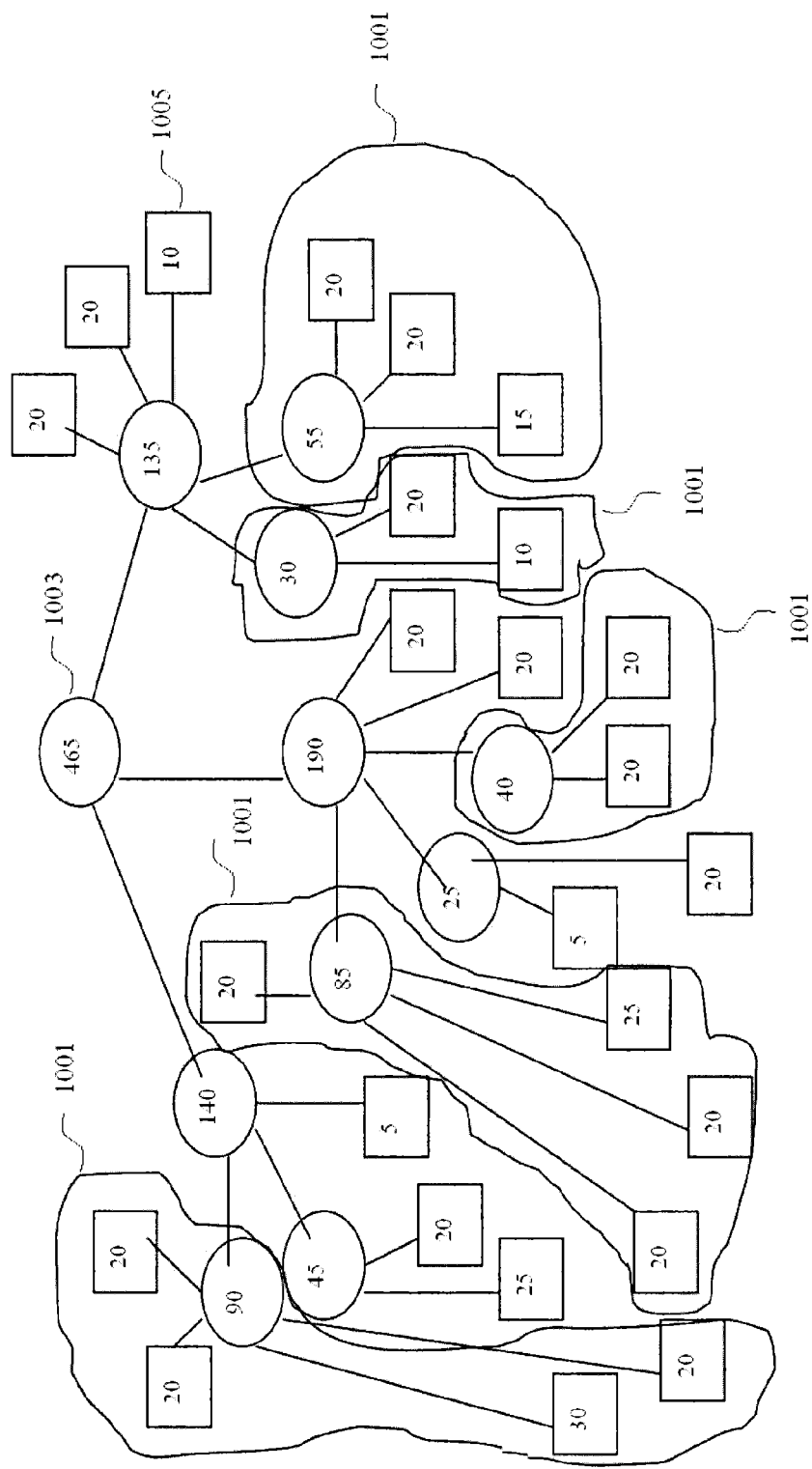
FIG. 10 shows a marked grid according to an embodiment of the invention.

FIG. 10 shows an example of a marked grid according to an embodiment of the invention. In this example, circles (1003) represent grids and squares (1005) represent cells. Each grid includes one or more cells in this example. The node count of cells under a grid adds up to make the node count of the grid. Maphandler will not read the marked subgrids (1001).

Compact Data Structure

Figure 11:
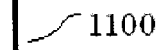
FIGS. 11A and 11B show an example grid and the corresponding in memory compact data structure, respectively, according to an embodiment of the invention.

FIG. 11A shows an example grid (1100).

Figure 11B:
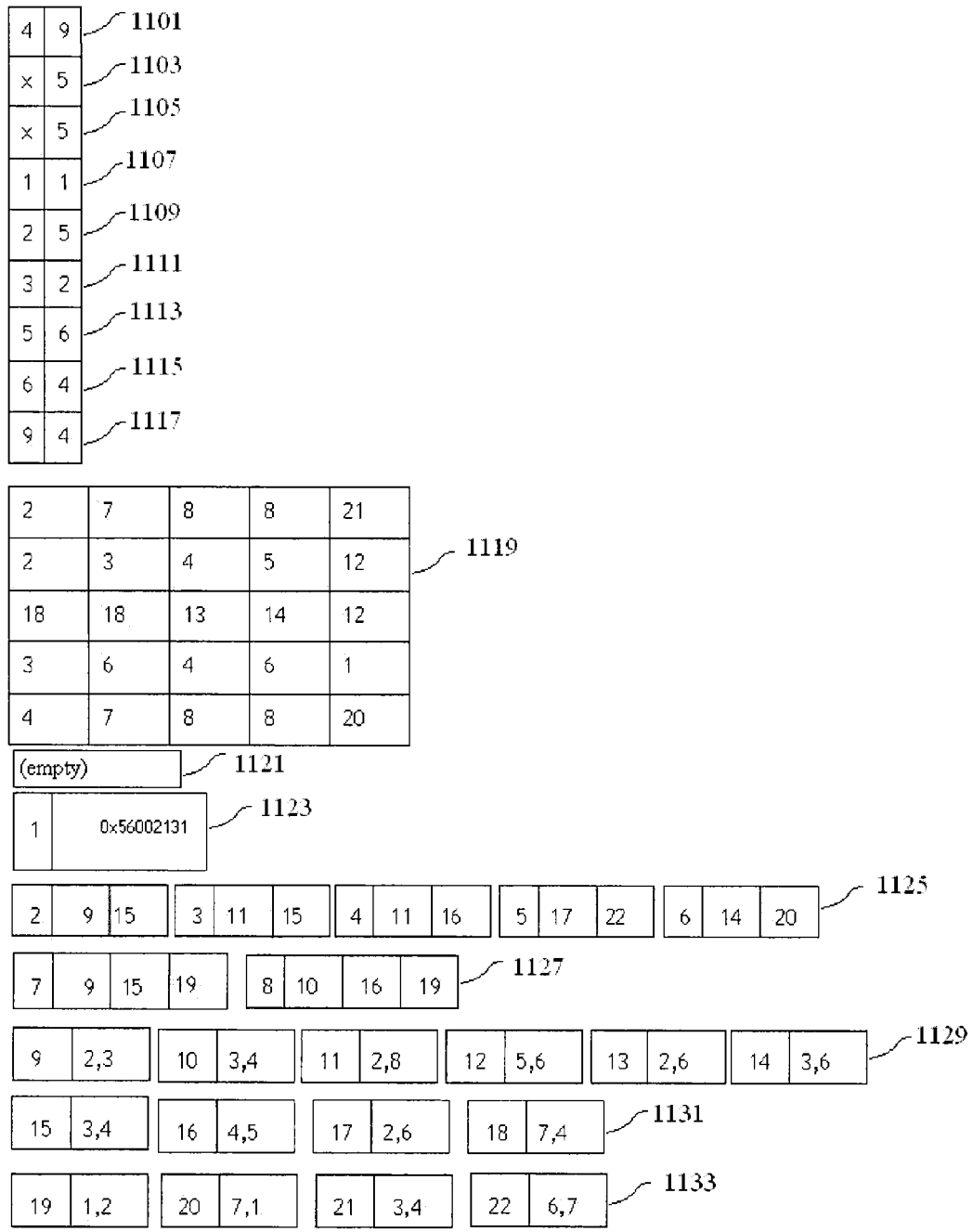

FIG. 11B shows the data structure stored in the operating memory for the example grid (1100). There are a set of four or more variable-length vectors (1101-1107). The first vector is the description vector (1101). To use the example grid (1100), a program according to an embodiment of the invention expands the description vector (1101) to create a set of offsets to the remaining vectors. The description vector (1101) and the next three vectors lat (1103), long (1105), and grid index (1107), are always present, according to one embodiment of the invention.

Each vector description entry is a predetermined type and length, for example a one-byte type and a one-byte length. The first four types are not used as types, since these vectors are mandatory. However the first type field is used as the type offset (TO) for the Beam vector types. In this example, a type of one is the subgrid type. Types from 2 to T0-1 are beam_info types, and the type is the length N of the entry. Types of T0 or more are beam value types and the type for beam B is TO+B.

In FIG. 11B, the first 9 rows are interpreted as follows:
4,9 //TO=4,length=9 for nine entries in this description vector (1101).
x,5 //lat vector descriptor (1103). Type is the scale. Length 9.
x,5 //long vector descriptor (1105), Type is the scale,length 9. The grid description following it.
1,1 //is skipped as that is inferred from lat long. subgrid descriptor (1107), type=1,length=100.
2,5 //2 beam information vectors of length 5 (1109).
3,2 //3 beam information vectors of length 2 (1111).
5,6 //Beam 1(5-4(TO))=1, length=6 (1113).
6.4 //Beam 2(6-4(TO))=2, length=4 (1115).
9,4 //Beam 5(9-4(TO))=5, length=4 (1117).

The 5×5 matrix (1119) that follows these lines includes the grid indexes.

The empty block (1121) after the 5×5 matrix is a missed memory block to align with 4 bytes boundary.

In each vector in the following blocks (1123-1125), the first element is an offset and the rest are pointers. For example, in
1, 0x56002131
1 is the memory location or offset. Content is the pointer to the location containing similar compact structure for this subgrid.

Each of the length 4 vectors (1127) include a list of three beam informations. Each entry is pointing to one beam entry. The first element of the vector is the offset to the memory location.

Each of the vectors including a scalar and a pair of scalars (1129-1133) correspond to beam values. the first element is the offset or memory location. The vectors starting with 9-14 list values for beam ID 1. The vectors starting with 15-18 list values for beam ID 2. The vectors starting with 19-22 list values for beam ID 5.

To process a grid, start by expanding the vector descriptions onto an ephemeral array. The array contains a computed pointer to the start of each vector, the computed based index for each vector, and the length of the vector entry for each vector. Next, look up the X and Y offsets for the geolocation of the remote apparatus, and then compute the offset in the grid index vector and retrieve the index. if the entry is 0, return an empty beam_info. Otherwise, check the index against each base index to determine which vector is being used. Subtract that base from the index, multiply by the entry length, and add the vector's pointer to get the address of the entry.

If the entry is a subgrid type, determine if the entry is a pointer or a file offset, and process accordingly. If the entry is a beam value, re-create a single-beam beam_info and return. Otherwise, the entry is a beam_info vector, and the number of value indexes is known. Extract each of them use it to look up a beam entry, and add the beamvalue entry to the beam_info structure, then return the beam_info structure.

An example of beam info is "1:2,3;", which refers to a single visible beam and the quality and EIRP numbers for it at a given location. In this example, the beam ID is 1, the quality is 3, and the EIRP is 2. If more than one beams are visible, then they are called a beam_info vector.

The worst-case grid structure in this example is 9+9+100+ (nbrofbeams+2)×2+100×(beamvectlen+1)*100×(nbrofbeams). That last factor is arbitrarily complex, but does not happen in the real world. For a realistic map, according to an embodiment of the invention, no point has more than 5 beams, no grid is 10×10, and the values are not unique. Assume a 5×5 grid with 20 unique values, all with 5 beams (very unusual) and 3 values per beam per point. This is 12+4+4+25+14+ 20*15, or 359 bytes. Almost all grids are smaller or much smaller.

If the maximum size of an individual grid is to be limited, an additional level may be dynamically introduced into the grid hierarchy when a single grid exceeds a predetermine size. This is best done while building the map file, but can also be done on the fly when the map is being read into the operating memory if necessary.

The indexing technique according to an embodiment of the invention may constrain the size of the grid structure such that there are no more than 254 unique indexes. An index may be used for each unique value and an index for each unique vector of length>1. Assuming a unique vector of len>1 in each grid location, at most 154 unique values may be used before the size is exceeded, and for average len of 5 (extreme) this is 750 byte total for the grid. The mapconverter can check that the encoding is not violated. If the encoding would otherwise be violated for a grid, the maphandler can replace the 2×1 grid with two subgrids.

Figure 12:
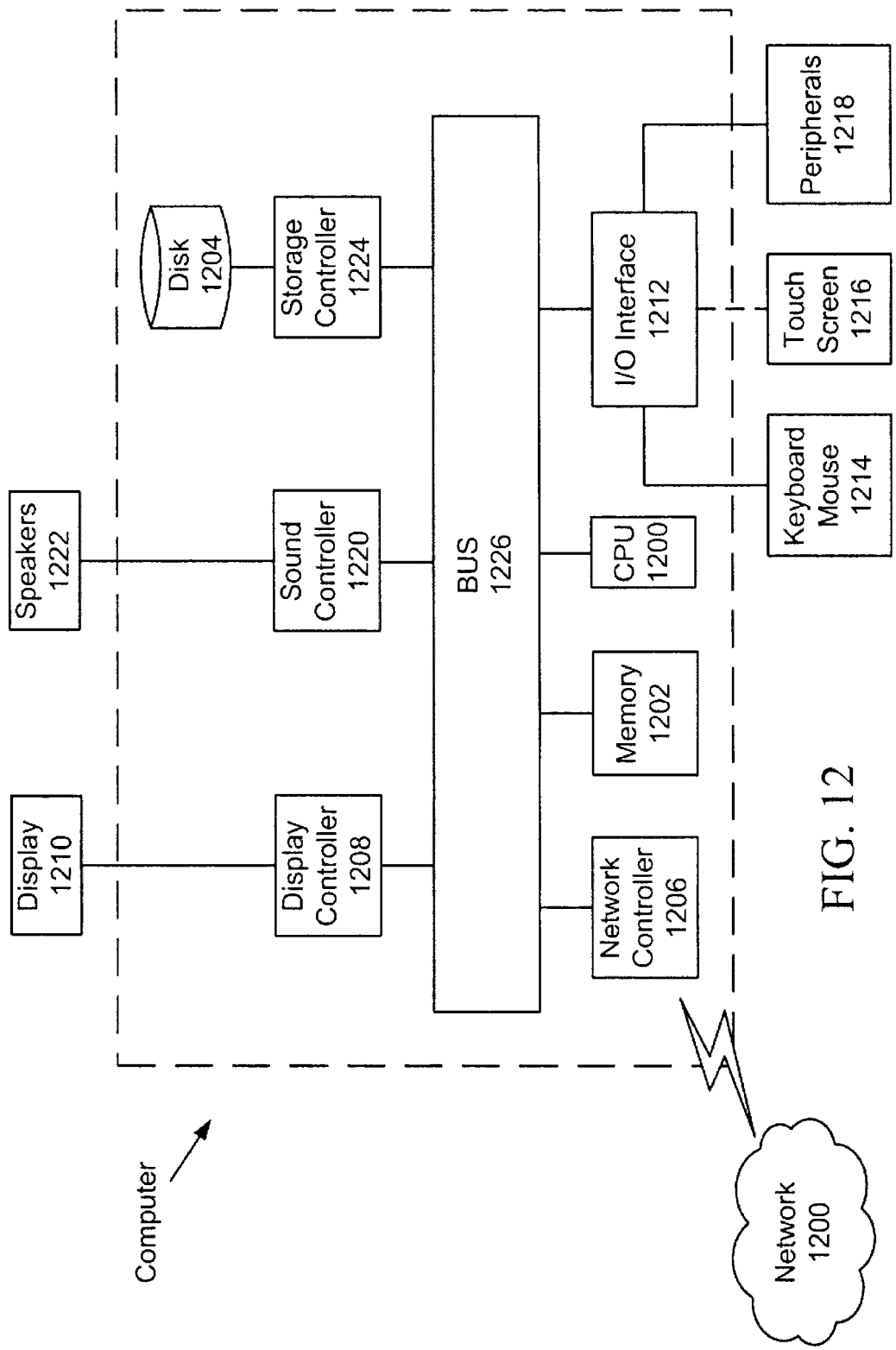
FIG. 12 is a block diagram of a computer.

Next, a hardware description of a computer according to exemplary embodiments is described with reference to FIG. 12. The computer may be used for the implementation of the algorithms and methods described in this disclosure. In FIG. 12, the computer includes a CPU 1200 which performs the processes described above. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server.

Further, the claimed advancements may be provided as a utility application, background daemon, or component of an operating system, or combination thereof, executing in conjunction with CPU 1200 and an operating system such as Microsoft Windows 7, UNIX, Solaris, LINUX, Apple MAC-OS and other systems known to those skilled in the art.

CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The computer in FIG. 12 also includes a network controller 1206, such as an Intel Ethernet PRO network interface card from Intel Corporation of America, for interfacing with network 1200. As can be appreciated, the network 1200 can be a public network, such as the Internet, or a private network such as an LAN or WAN network, or any combination thereof and can also include PSTN or ISDN sub-networks. The network 1200 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the computer, such as Sound Blaster X-Fi Titanium from Creative, to interface with speakers/microphone 1222 thereby providing sounds and/or music. The speakers/microphone 1222 can also be used to accept dictated words as commands for controlling the computer or for providing location and/or property information with respect to the target property.

The general purpose storage controller 1224 connects the storage medium disk 1204 with communication bus 1226, which may be an ISA, EISA, VESA, PCI, or similar, for interconnecting all of the components of the computer. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method of communicating via a satellite using a remote apparatus that transmits a signal to the satellite, the method including:
   determining a geographical location of the remote apparatus;
   determining a local data set corresponding to the geographical location, the local data set including communication parameters for controlling the communicating via the satellite conducted by the remote apparatus from the geographical location;
   retrieving the local data set from a global data set stored entirely in a memory of the remote apparatus, the global data set including local data sets corresponding to every geographical location in the world;
   transmitting a signal from the remote apparatus to the satellite according to the communication parameters in the local data set retrieved from the global data set stored entirely in the memory of the remote apparatus; and
   communicating via the satellite using a beam according to the communication parameters, the communication parameters including, for each of a plurality of beams, a beam name, a beam receive quality, and a beam equivalent isotropically radiated power.

2. The method of claim 1, further comprising:
   prohibiting a transmission from the remote apparatus based on a regulatory transmit prohibition for the beam at the geographical location, the regulatory transmit prohibition for the beam at the geographical location being indicated by a value of the beam equivalent isotropically radiated power being zero.

3. The method of claim 1, further comprising:
   selecting the beam from the plurality of beams based on the beam receive quality in the communication parameters.

4. A method of communicating via a satellite using a remote apparatus that transmits a signal to the satellite, the method including:
   determining a geographical location of the remote apparatus;
   determining a local data set corresponding to the geographical location, the local data set including communication parameters for controlling the communicating via the satellite conducted by the remote apparatus from the geographical location;
   retrieving the local data set from a global data set stored entirely in a memory of the remote apparatus, the global data set including local data sets corresponding to every geographical location in the world; and
   transmitting a signal from the remote apparatus to the satellite according to the communication parameters in the local data set retrieved from the global data set stored entirely in the memory of the remote apparatus,
   wherein the global data set includes a plurality of hierarchically arranged grids and each grid at a same hierarchical level corresponds to a different geographical region, the method further comprising:
   selecting an upper level grid corresponding to the geographical location of the remote apparatus from a plurality of upper level grids at a same hierarchical level in the plurality of hierarchically arranged grids in the global data set;

selecting a lower level grid corresponding to the geographical location of the remote apparatus from a plurality of lower level grids in the upper level grid; and recursively descending through the plurality of hierarchically arranged grids until reaching a grid that contains only the local data set.

5. The method of claim 4, wherein the recursively descending through the plurality of hierarchically arranged grids is performed without decompressing any data in the global data set until reaching the grid that contains only the local data set.

6. A non-transitory computer readable medium having computer readable instructions thereon that, when executed by a computer in a remote apparatus that transmits a signal to a communication satellite, cause the computer to perform a method comprising:

determining a geographical location of the remote apparatus;

determining a local data set corresponding to the geographical location, the local data set including communication parameters for controlling a communication via the satellite conducted by the remote apparatus from the geographical location;

retrieving the local data set from a global data set stored entirely in a memory of the remote apparatus, the global data set including local data sets corresponding to every geographical location in the world;

transmitting a signal from the remote apparatus to the satellite according to the communication parameters in the local data set retrieved from the global data set stored entirely in the memory of the remote apparatus; and communicating via the satellite using a beam according to the communication parameters, the communication parameters including, for each of a plurality of beams, a beam name, a beam receive quality, and a beam equivalent isotropically radiated power.

7. A satellite communication system, the system comprising:

a hub apparatus;

a satellite; and a remote apparatus communicating with the hub apparatus via the satellite, the remote apparatus including a memory unit configured to store a global data set including data sets corresponding to every geographical area in the world, each data set including a plurality of cells, each cell including communication parameters for a unique geographical location, a locating unit configured to determine a geographical location of the remote apparatus, a determining unit configured to determine a local data set corresponding to the geographical location, the data set including communication parameters for a communication conducted by the remote apparatus from the geographical location, a retrieving unit configured to retrieve the local data set from a global data set stored entirely in a memory of the remote apparatus, the global data set including local data sets corresponding to every geographical location in the world, and a communication unit configured to conduct the communication via the satellite by the remote apparatus according to the communication parameters.

8. A method of communicating via a satellite using a remote apparatus, the method including:

determining a geographical location of the remote apparatus;

determining a local data set corresponding to the geographical location, the data set including communication parameters for a communication conducted by the remote apparatus from the geographical location;

retrieving the local data set from a global data set stored entirely in a memory of the remote apparatus, the global data set including local data sets corresponding to every geographical location in the world;

conducting the communication via the satellite by the remote apparatus according to the communication parameters, wherein the global data set includes a plurality of hierarchically arranged grids and each grid at a same hierarchical level corresponds to a different geographical region;

selecting an upper level grid corresponding to the geographical location of the remote apparatus from a plurality of upper level grids at a same hierarchical level in the plurality of hierarchically arranged grids in the global data set;

selecting a lower level grid corresponding to the geographical location of the remote apparatus from a plurality of lower level grids in the upper level grid; and recursively descending through the plurality of hierarchically arranged grids until reaching a grid that contains only the local data set.

9. The method of claim 8, wherein the recursively descending through the plurality of hierarchically arranged grids is performed without decompressing any data in the global data set until reaching the grid that contains only the local data set.

* * * * *